(12) United States Patent
Walker

(10) Patent No.: US 11,013,177 B2
(45) Date of Patent: May 25, 2021

(54) AGRICULTURAL HARVESTER WITH ONE-WAY OPENING CROP SAVERS

(71) Applicant: CNH Industrial America LLC, New Holland, PA (US)

(72) Inventor: Eric L. Walker, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 150 days.

(21) Appl. No.: 16/205,386

(22) Filed: Nov. 30, 2018

(65) Prior Publication Data

US 2020/0170188 A1 Jun. 4, 2020

(51) Int. Cl.
*A01D 57/22* (2006.01)
*A01D 45/02* (2006.01)

(52) U.S. Cl.
CPC ............ *A01D 57/22* (2013.01); *A01D 45/02* (2013.01)

(58) Field of Classification Search
CPC ...... A01D 57/22; A01D 45/02; A01D 45/021; A01D 43/082; A01D 45/025; A01D 41/06; A01D 45/023; A01D 63/00
See application file for complete search history.

(56) References Cited

U.S. PATENT DOCUMENTS

| | | | |
|---|---|---|---|
| 1,219,327 A * | 3/1917 | Keeler ................. | A01D 45/021 56/106 |
| 2,981,045 A | 4/1961 | Blanshine et al. | |
| 4,037,393 A | 7/1977 | Anderson | |
| 4,300,335 A * | 11/1981 | Anderson ............ | A01D 45/021 56/119 |
| 4,493,181 A | 1/1985 | Glendenning et al. | |
| 4,630,430 A * | 12/1986 | Weeks ................. | A01D 45/025 56/105 |
| 5,195,309 A * | 3/1993 | Mossman ............ | A01D 43/082 56/105 |
| 5,761,893 A * | 6/1998 | Lofquist .............. | A01D 45/021 56/94 |
| 5,980,383 A * | 11/1999 | Medley ................ | A01D 61/008 460/114 |
| 6,293,078 B1* | 9/2001 | Deutsch ................ | A01D 46/14 56/44 |
| 7,658,058 B2 | 2/2010 | Pierson | |
| 7,913,480 B2* | 3/2011 | Christensen ......... | A01D 45/021 56/62 |

(Continued)

FOREIGN PATENT DOCUMENTS

FR 2486764 A1 1/1982

OTHER PUBLICATIONS

Extended European Search Report for EP application 19212238.0, dated Mar. 20, 2019 (7 pages).

*Primary Examiner* — Arpad Fabian-Kovacs
(74) *Attorney, Agent, or Firm* — Peter Zacharias; Patrick Sheldrake

(57) ABSTRACT

A header for an agricultural vehicle includes: a header frame; at least two row dividers carried by the header frame and defining a gap therebetween; and a crop material saver disposed in the gap and including a pair of saver flaps, each of the saver flaps being positioned such that the saver flaps co-act as a one-way pass-through to allow crop material flow past the saver flaps in an admission direction and inhibit crop material flow past the saver flaps in an inhibited direction opposite the admission direction.

16 Claims, 5 Drawing Sheets

(56) References Cited

U.S. PATENT DOCUMENTS

| | | | |
|---|---|---|---|
| 7,930,870 B2 | 4/2011 | Rottinghaus | |
| 8,413,413 B2* | 4/2013 | Lohrentz | A01D 45/021 56/95 |
| D697,535 S * | 1/2014 | Walker | D15/28 |
| D697,944 S * | 1/2014 | Walker | D15/28 |
| D739,881 S * | 9/2015 | Walker | D15/28 |
| 9,265,198 B2 | 2/2016 | Hulstein et al. | |
| 10,194,588 B2* | 2/2019 | Lohrentz | A01D 45/021 |
| 2015/0128549 A1* | 5/2015 | Hulstein | A01D 45/021 56/14.7 |
| 2017/0339827 A1* | 11/2017 | Anderson | A01D 41/06 |
| 2020/0060088 A1* | 2/2020 | Bell | A01D 63/04 |

* cited by examiner

AGRICULTURAL HARVESTER WITH ONE-WAY OPENING CROP SAVERS

FIELD OF THE INVENTION

The present invention pertains to an agricultural vehicle and, more specifically, to a header for an agricultural vehicle including crop savers.

BACKGROUND OF THE INVENTION

The header of an agricultural harvester or combine is provided with row dividers and associated hoods for directing rows of corn stalks to downstream separation devices known as row units. The row units include stalk receiving slots and stripping plates, snapping rolls, and opposed rearwardly moving gathering chains. Thus, e.g., following separation of ears from stalks by the snapping rolls and stripping plates (also known as stalk rolls and deck plates, respectively), the separated ears are delivered by the gathering chains to an auger which conveys the harvested ears to a feederhouse of the combine. Harvested ears are then processed to the combine's inner chambers for downstream processing.

Row unit frames are typically constructed with forwardly projecting members that support several components of the row unit including the deck plates, the stalk roll support bearings, the front gathering chain idlers, the hoods and the row dividers. The deck plates are flat or planar with their shape being dictated by the geometry of the row unit frames. As is known, the stalk rolls are disposed beneath the deck plates and are cooperatively rotated to pull the corn stalks downwardly into the stalk receiving slots where the ears come into contact with the deck plates and are snapped off of the stalks by the deck plates. The deck plates lie generally tangent to the upper surfaces of the stalk rolls and the stalk rolls engage the corn stalks at "pinch points" situated below the upper surfaces of deck plates.

The deck plates are generally provided in pairs defining a gap therebetween, allowing the corn stalks to enter the gap before being pulled down to the deck plates so the corn ear snaps off the stalk. Many headers are equipped with flaps, known as "ear savers," that are mounted to a rear of the row dividers to prevent collected ears from being lost after snapping off the stalk. While ear savers are generally effective to reduce crop loss during harvesting, crop loss still does occur for various reasons.

What is needed in the art is a header that can reduce crop loss during harvesting.

SUMMARY OF THE INVENTION

In one exemplary embodiment formed in accordance with the present disclosure, there is provided a header with a crop material saver having a pair of saver flaps that co-act as a one-way pass-through and inhibit collected crop material from being lost.

In another exemplary embodiment formed in accordance with the present disclosure, there is provided a header for an agricultural vehicle, including: a header frame defining a travel axis; at least two row dividers carried by the header frame and defining a gap therebetween; and a crop material saver disposed in the gap and including a pair of saver flaps, each of the saver flaps being positioned such that the saver flaps co-act as a one-way pass-through to allow crop material flow past the saver flaps in an admission direction and inhibit crop material flow past the saver flaps in an inhibited direction opposite the admission direction.

In yet another exemplary embodiment formed in accordance with the present invention, there is provided an agricultural vehicle including a chassis defining a travel axis and a header carried by the chassis. The header includes: a header frame; at least two row dividers carried by the header frame and defining a gap therebetween; and a crop material saver disposed in the gap and including a pair of saver flaps, each of the saver flaps being positioned such that the saver flaps co-act as a one-way pass-through to allow crop material flow past the saver flaps in an admission direction and inhibit crop material flow past the saver flaps in an inhibited direction opposite the admission direction.

One possible advantage of exemplary embodiments formed in accordance with the present disclosure is that the saver flaps act as a one-way pass-through that can be easily opened to admit crop material, such as corn stalks with ears, past the saver flaps while being closed to reverse flow of severed ears to reduce crop material loss from the header.

Another possible advantage of exemplary embodiments formed in accordance with the present disclosure is the saver flaps can be mounted to a flat portion of the row divider that is recessed and out of the incoming flow of crop material so the saver flaps do not substantially interfere with the incoming flow.

Yet another possible advantage of exemplary embodiments formed in accordance with the present disclosure is that the crop material saver can be partially placed above deck plates of the header to reduce crop material loss from the header that occurs when the corn ears are snapped off the stalks by the deck plates.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

Figure 1:
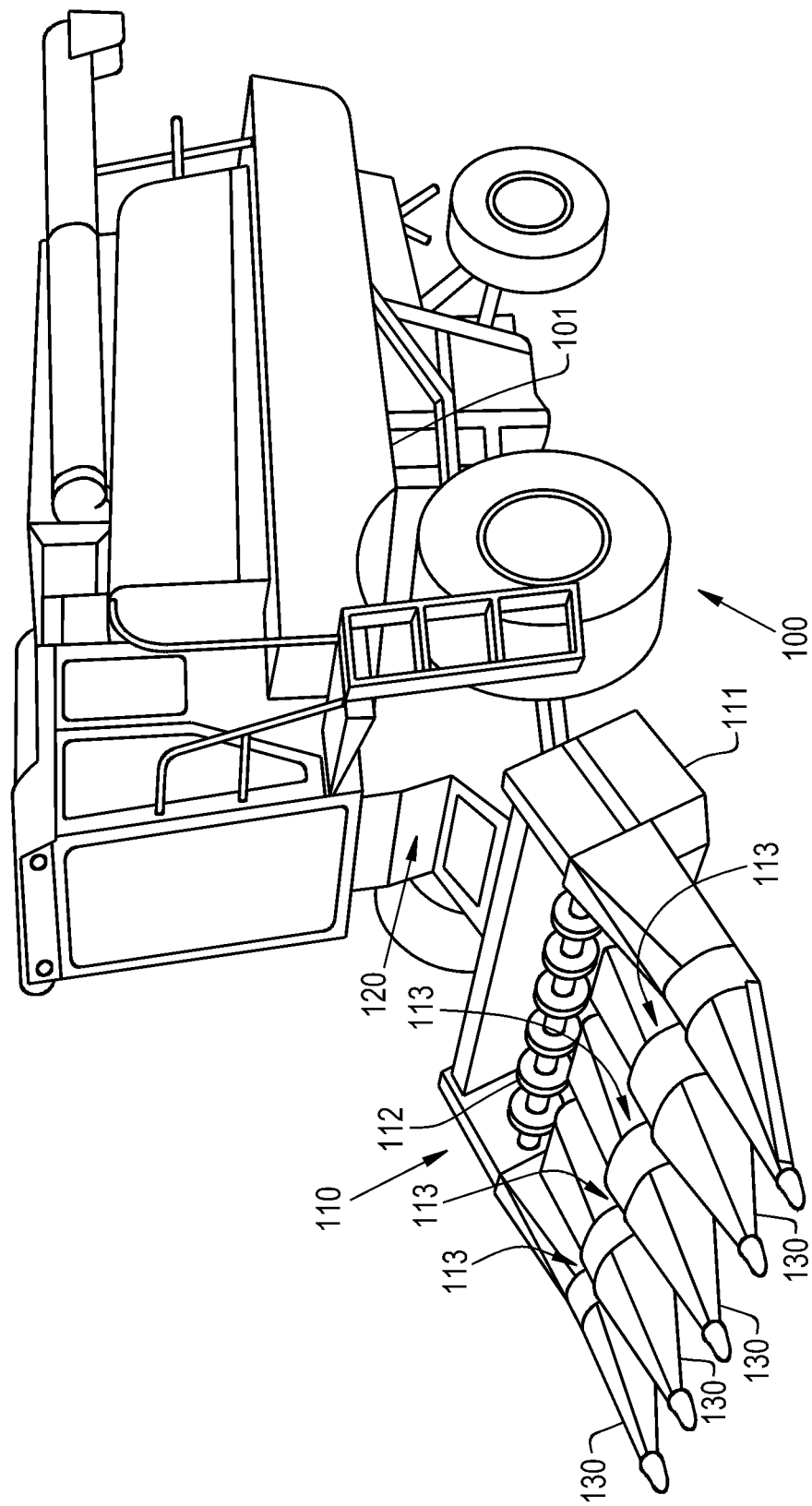
FIG. 1 illustrates a perspective view of an exemplary embodiment of an agricultural vehicle, the agricultural vehicle comprising a chassis and a header, in accordance with an exemplary embodiment of the present disclosure.

Referring now to the drawings, FIG. 1 illustrates an exemplary embodiment of an agricultural harvester such as a combine 100 including a chassis 101 carrying a header 110, shown as a corn header, in accordance with the present invention. The header 110 is shown to be operatively carried by the chassis 101 for harvesting e.g., cutting corn and feeding the corn to a feederhouse for receiving crop residue, cutting, chopping and propelling the residue rearwardly and outwardly from the agricultural harvester 100 while retaining the valuable corn ears and kernels. Such feederhouses and harvesting operations are known in the art and a further detailed description of their structure, function and operation is not necessary for a complete understanding of the present invention. Alternatively, the header 110 can be connected to any device that may have use for a corn header.

Figure 2:
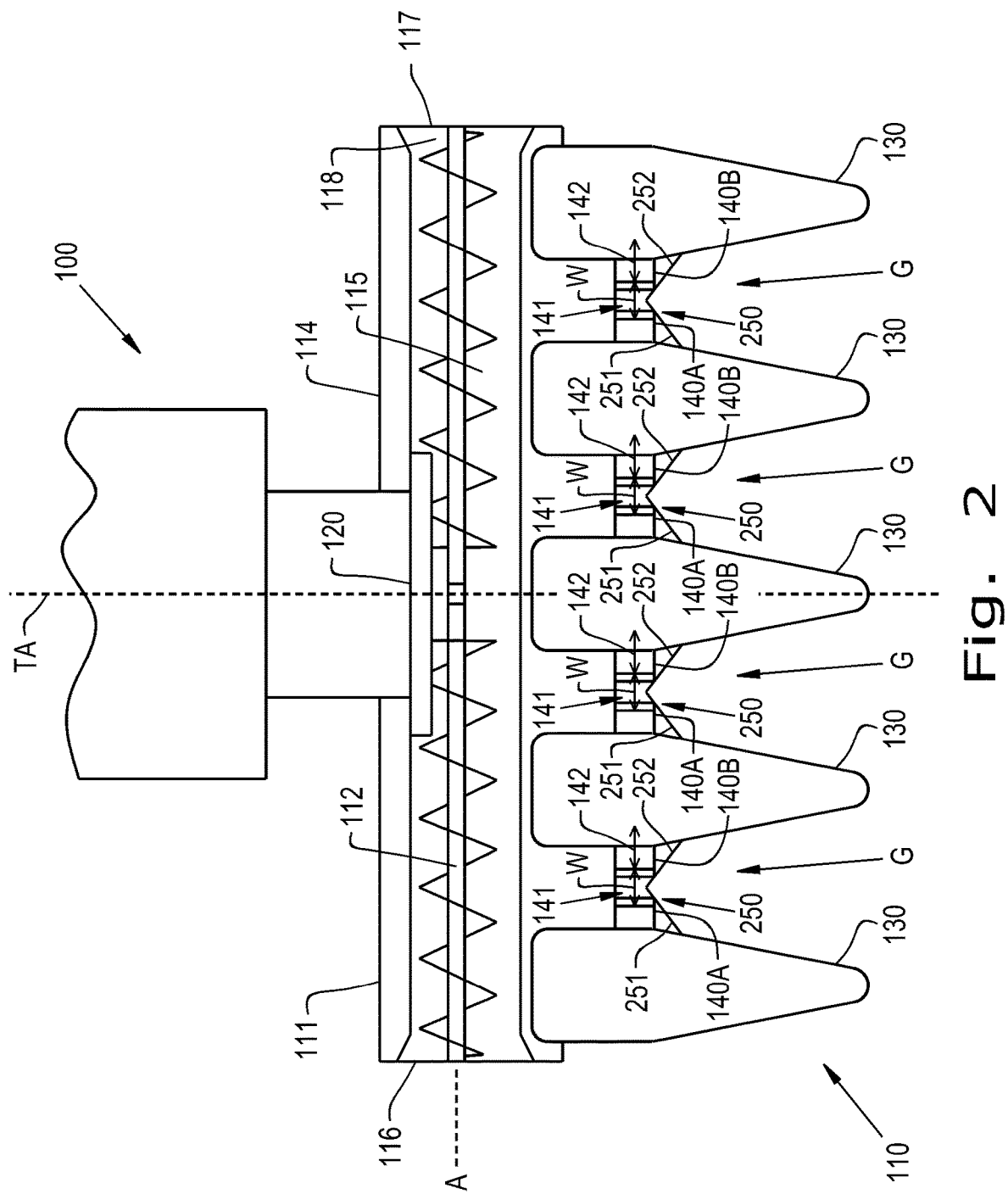
FIG. 2 illustrates a top view of a portion of the agricultural vehicle illustrated in FIG. 1.

Referring to FIGS. 1 and 2, the header 110 includes a header frame 111 for mounting to a forward end of the agricultural harvester 100, a conveyor 112 (such as an auger) extending lengthwise across the header frame 111 for conveying crop material to a combine feeding location or feederhouse 120, and a plurality of row units 113 extending forwardly from the header frame 111. In the shown exemplary embodiment, the header frame 111 can be configured as a substantially rectangular frame; in other exemplary embodiments, the header frame 111 can be configured in different shapes. As seen in FIG. 2, the header frame 111 includes a rear wall 114, a bottom wall 115 and a pair of side walls 116, 117. The header frame 111 further includes a channel 118 formed partially by the bottom wall 115. The conveyor 112 conveys harvested corn along the channel 118 to the combine feeding location 120 located adjacent a midpoint of the channel 118.

The conveyor 112 can be a screw auger conveyor, but can alternatively be any conveyor capable of moving grain through the channel 118, such as a paddle system, a conveyor belt, a pressure based system, or any combination thereof. Such conveyors are known in the art and a further detailed description of their structure, function and operation is not necessary for a complete understanding of the present invention. However, typical augers applicable to the present invention are disclosed in U.S. Pat. Nos. 8,267,240 and 4,621,968, the entire disclosures of which are incorporated by reference herein.

The auger 112 can be connected to the header frame 111 at the side walls 116, 117 and rotates about axis A. The half of the auger 112 that is closest to side wall 116 moves the harvested crop towards the opposite side wall 117 and the half of the auger 112 that is closest to side wall 117 moves the harvested crop towards the opposite side wall 116. The auger 112 is positioned in front or above the combine feeding location 120 and, as the auger 112 rotates, harvested grain moves towards the center of the auger 112 for feeding the harvested grain into the combine feeding location 120.

Referring still to FIGS. 1 and 2, the header 100 can further include a plurality of row dividers 130. The row dividers 130 extend forwardly from the header frame 111 and are connected to extend across a pair of adjacent row units 113 (FIG. 1). The dividers 130 extend forwardly from the header frame 111 and are connected to the plurality of row units 113 for directing a row of corn stalks towards deck plates 140A, 140B (also commonly known as a stripping plates) of the row units 113 (FIG. 2). That is, during harvesting operations, the row dividers 130 direct a row of corn stalk towards deck plates 140A, 140B and stalk stripping rolls (not shown) situated between adjacent row dividers 130. The deck plates 140A, 140B form a gap, which may also be referred to as a deck plate channel 141, therebetween for receiving corn stalks and, as is known, the stalk stripping rolls pull the stalk downwardly snapping the corn ear when it strikes the deck plates 140A, 140B. The stalk stripping rolls can pull most of the crop residue down and out of the header 110.

Referring specifically now to FIG. 2, it can be seen that the deck plates 140A, 140B of the row units 113 can be paired together so the deck plates 140A, 140B include a first deck plate 140A and a second deck plate 140B, the deck plates 140A, 140B forming the deck plate channel 141 therebetween. The deck plate channel 141, as can be seen, defines a channel width W between the deck plates 140A, 140B and a width direction, indicated by arrow 142, with movement of the deck plates 140A, 140B in the width direction 142 changing the channel width W defined between the deck plates 140A, 140B. As should be appreciated, the channel width W defined between the deck plates 140A, 140B determines the width of stalks that may be admitted into the deck plate channel 141 instead of being severed by the deck plates 140A, 140B during harvesting.

The header 110 includes one or more crop material savers 250 to reduce crop material losses during harvesting. As illustrated in FIG. 2, each crop material saver 250 is disposed in a gap G defined between adjacent row dividers 130. Each of the crop material savers 250 includes a pair of saver flaps, which may comprise a first saver flap 251 and a second saver flap 252, that co-act as a one-way pass-through, as will be described further herein. In some embodiments, one or both of the saver flaps 251, 252 define a non-perpendicular angle, i.e., define an acute angle or an obtuse angle, with respect to a travel axis TA, the significance of which will be described further herein. While the saver flaps 251, 252 are illustrated as both being acutely angled with respect to the travel axis TA, it should be appreciated that the saver flaps 251, 252 may be obtusely angled with respect to the travel axis TA. In some embodiments, the travel axis TA is defined by the chassis 101 of the combine 100 and represents the axis on which the combine 100 travels during forward motion. In some embodiments, the travel axis TA is defined by the header frame 111 and represents the axis on which the header 110 travels when carried by, for example, an agricultural vehicle such as the combine 100.

Figure 3:
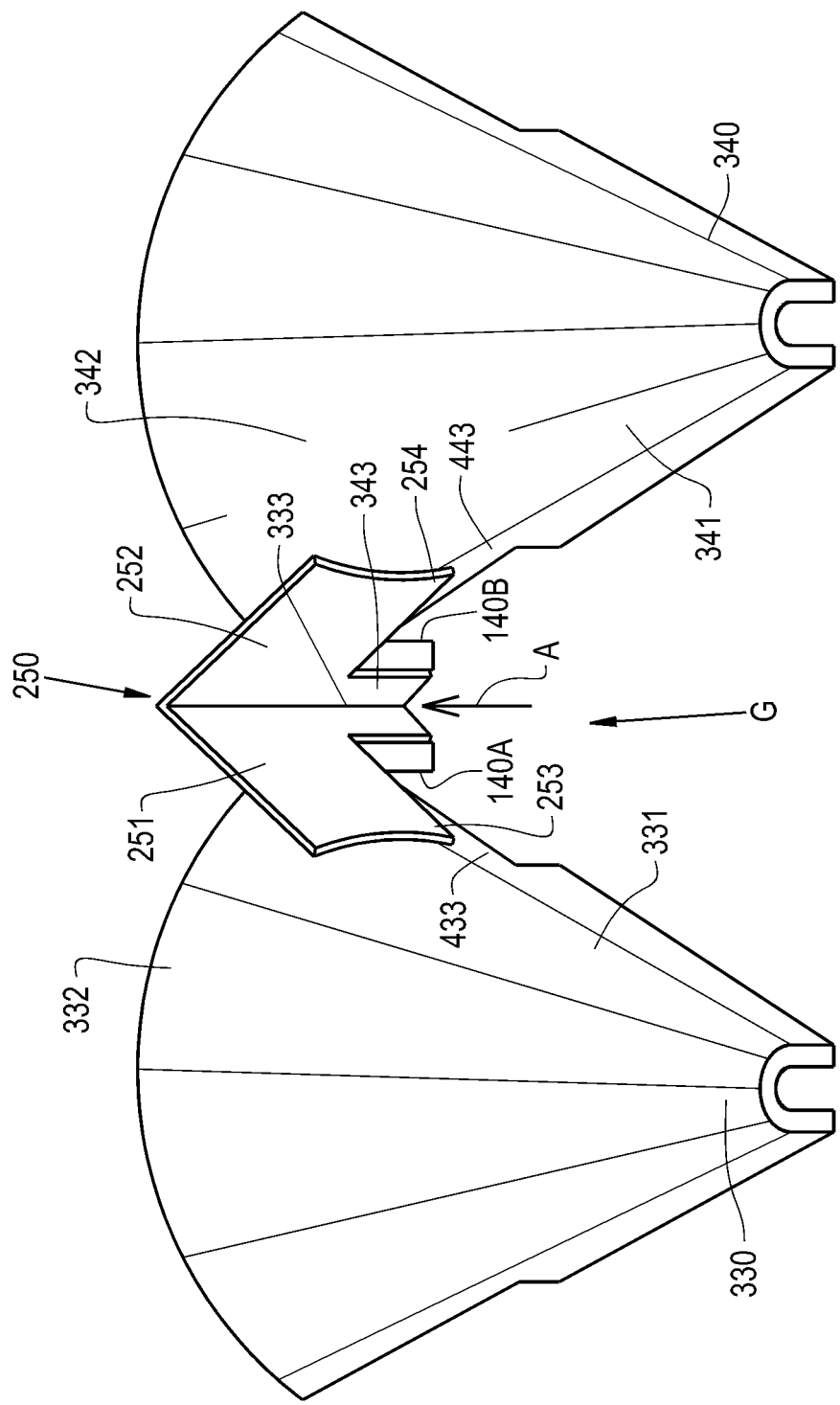
FIG. 3 illustrates a perspective view of row dividers and saver flaps illustrated in FIG. 2 and formed in accordance with the present disclosure.
Figure 4:
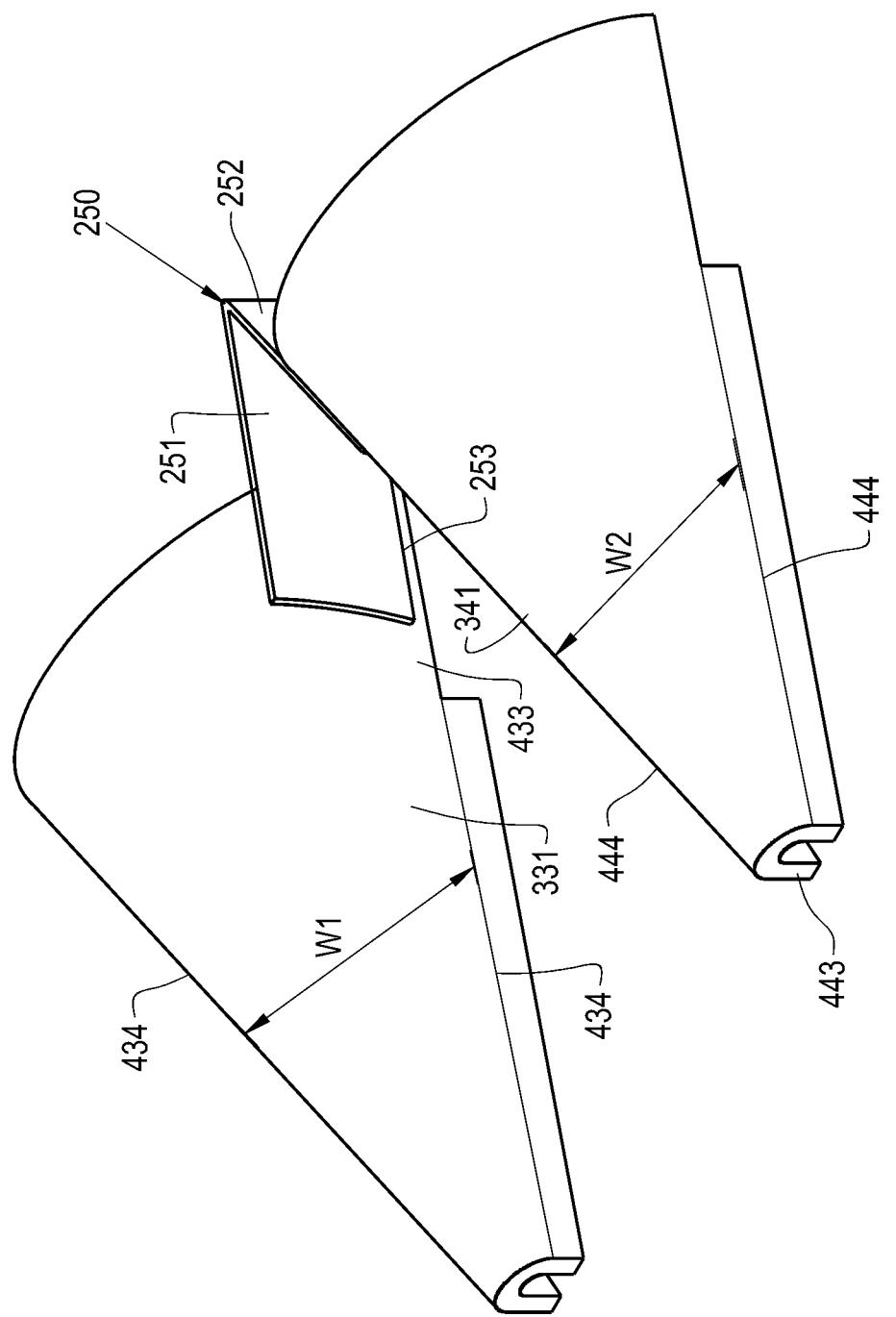
FIG. 4 illustrates another perspective view of the row dividers and saver flaps illustrated in FIGS. 2-3.
Figure 5:
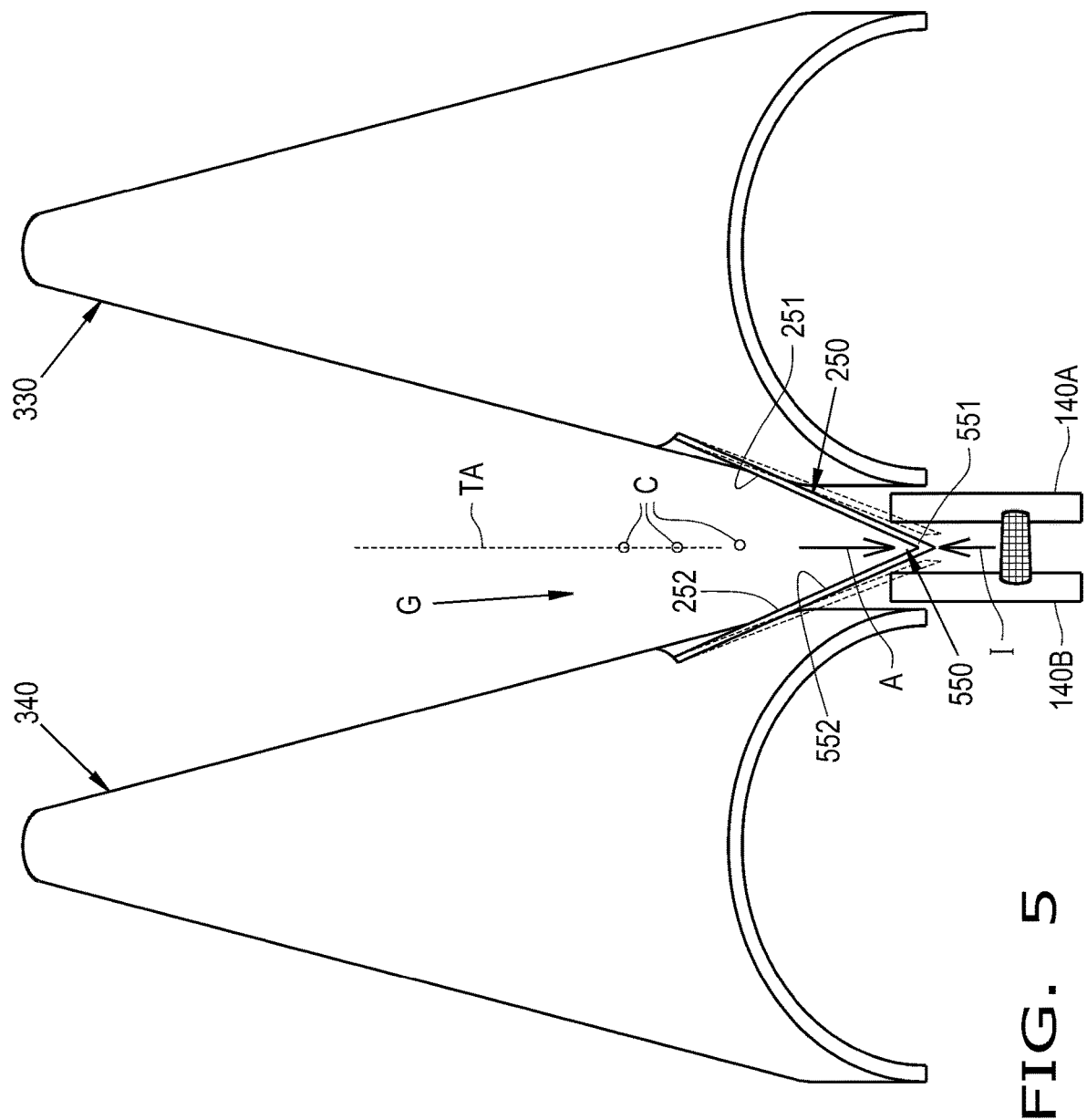
FIG. 5 illustrates a top view of the row dividers and saver flaps illustrated in FIGS. 2-4.

Referring specifically now to FIGS. 3-5, the crop material saver 250 is illustrated in further detail. As can be seen, the first saver flap 251 may connect to a side surface 331 of one of the row dividers, referred to further herein as a first row divider 330, and the second saver flap 252 may connect to a side surface 341 of another row divider, referred to further herein as a second row divider 340. The previously described gap G may therefore be formed between the first row divider 330 and the second row divider 340, with the crop material saver 250 disposed in this gap G. In some embodiments, the first saver flap 251 includes a first mounting portion 253 that mounts to the first side surface 331 and the second saver flap 252 includes a second mounting portion 254 that mounts to the second side surface 341. Such mounting is in contrast to known crop material savers, which mount to a rear of the row dividers, as will be further described herein. The first mounting portion 253 and the second mounting portion 254 may both be mounted to their respective side surface 331, 341 to define a respective non-perpendicular angle relative to the travel axis TA. The non-perpendicular angle of each mounting portion 253, 254 relative to the travel axis TA may also define the non-perpendicular angle of each mounting portion's respective saver flap 251, 252 relative to the travel axis TA. In some embodiments, the first saver flap 251 and the second saver flap 252 both comprise a rubber, or similar material, so the saver flaps 251, 252 are generally flexible and easily deformed by incoming crop material. The flexible material of the saver flaps 251, 252 may also allow the saver flaps 251, 252 to readily conform to respective curved portions 332, 342 of the first side surface 331 and the second side surface 341. In some embodiments, portions of the saver flaps 251, 252, including but not limited to respective bottom portions 333, 343, are disposed above the deck plate channel 141 to prevent, for example, loss of snapped corn ears from the header 110, as will be described further herein. It should be appreciated that the saver flaps 251, 252 may comprise a relatively inflexible material, such as a polyethylene or a polyamide, that is attached to a respective side surface 331, 332 by a flexible mounting such as, for example, a hinge or a spring so the saver flaps 251, 252 can move relative to the side surfaces 331, 341.

Referring specifically now to FIG. 4, it can be seen that the first side surface 331 has a first flat portion 433 and the second side surface 341 has a second flat portion 443. The first mounting portion 253 of the first saver flap 251 may connect to the first flat portion 433 and the second mounting portion 254 may connect to the second flat portion 443. The first row divider 330 may include a pair of lateral edges 434 that define a width W1 of the first row divider 330 therebetween and the second row divider 340 may also include a pair of lateral edges 444 that define a width W2 of the second row divider 340 therebetween. As can be appreciated from FIGS. 3-4, the first flat portion 433 may be recessed inwardly relative to the lateral edge 434 of the first row divider 330 and the second flat portion 443 may be recessed inwardly relative to the lateral edge 444 of the second row divider 340. In this sense, the lateral edges 434, 444 of the row dividers 330, 340 are generally what will be in contact with the incoming flow of crop material to guide the crop material to, for example, the deck plates 140A, 140B.

Referring specifically now to FIG. 5, the function of the crop material saver 250 is illustrated. As can be seen, the saver flaps 251, 252 converge toward one another to define a crop admission region 550 where incoming crop material flow, such as standing corn rows C, may pass the saver flaps 251, 252 during harvesting so the deck plates 140A, 140B can sever the ears from the stalks. Unlike traditional ear savers, which extend generally perpendicular to the travel axis, the saver flaps 251, 252 may be non-perpendicularly angled, such as acutely angled, with respect to the travel axis TA and positioned so that one or both of the saver flaps 251, 252 may deflect from a closed position, illustrated in solid lines, to an open position, illustrated in dashed lines, when contacted by incoming crop material flow, such as a corn stalk, to admit the crop material flow through the crop material saver 250. Deflection of one or both of the saver flaps 251, 252 may be due to the flexibility of the material of the saver flap(s) 251, 252 and/or due to the flexible mounting of the saver flap(s) 251, 252 to a respective side surface 331, 332.

When the crop material flow passes the saver flaps 251, 252 and no longer contacts one or both of the flaps 251, 252, the flap(s) 251, 252 returns to its corresponding closed position to prevent, for example, corn ears that are snapped off the stalks by the deck plates 140A, 140B from pushing open the crop material saver 250, thus retaining the corn ears in the header 110. In this sense, the saver flaps 251, 252 co-act as a one-way pass-through to allow crop material flow past the saver flaps 251, 252 in an admission direction, illustrated as arrow A in FIG. 5, and inhibit crop material flow past the saver flaps 251, 252 in an inhibited direction opposite the admission direction A, with the inhibited direction illustrated by arrow I. Both the admission direction A and the inhibited direction I can extend parallel to the travel axis TA. As can be appreciated from FIG. 5, crop material flow in the admission direction A forces the portions of the saver flaps 251, 252 in the admission region 550 away from one another, opening the crop material saver 250 to allow passage of the crop material flow. In contrast, crop material flow in the inhibited direction I forces the portions of the saver flaps 251, 252 in the admission region 550 toward one another, which substantially inhibits the crop material flow in the inhibited direction I from opening the crop material saver 250 to pass therethrough. Therefore, crop material flow in the admission direction A can easily open and pass through the crop material saver 250, while crop material flow in the inhibited direction I is generally inhibited from opening and passing through the crop material saver 250. In this respect, the saver flaps 251, 252 of the crop material saver 250 co-act similarly to a one-way valve.

In some embodiments, the first saver flap 251 and the second saver flap 252 contact one another to define the crop admission region 550 that allows crop material flow in the admission direction A to pass the crop material saver 250. An edge of the first saver flap 251, such as an edge 551 adjacent to an end of the first saver flap 251, may contact a surface 552 of the second saver flap 252 to define the admission region 550. In such a configuration, the edge 551 of the first saver flap 251 will tend to ride along the surface 552 of the second saver flap 252 when crop material flow in the admission direction A is in the admission region 550. The incoming crop material flow in the admission direction A deflects the first saver flap 251 away from the second saver flap 252 to open the crop material saver 250 and allow passage of the crop material flow in the admission direction A. In some embodiments, the surface of the second saver flap 252 contacted by the edge 551 of the first saver flap 251 is an edge of the second saver flap 252, i.e., the saver flaps 251, 252 contact one another edge-to-edge. In some embodiments, the saver flaps 251, 252 do not contact one another at all to define the admission region 550. When the saver flaps 251, 252 do not contact one another, a gap may be formed between the saver flaps 251, 252 that is sized to close when crop material flow, such as snapped corn ears, traveling in the inhibited direction I reaches the admission region 550. The size of the gap formed between the saver flaps 251, 252 may be large enough to allow admission of standing crop material, such as corn stalks, in the admission direction A while also being small enough to prevent passage of collected crop material, such as corn ears, past the saver flaps 251, 252 in the inhibited direction I. It should thus be appreciated that, even if a gap is formed between the saver flaps 251, 252, the saver flaps 251, 252 may still co-act as a one-way pass-through to allow crop material flow past the saver flaps 251, 252 in the admission direction A and inhibit crop material flow past the saver flaps 251, 252 in the inhibited direction I.

From the foregoing, it should be appreciated that positioning the saver flaps 251, 252 to co-act as a one-way pass-through can decrease crop loss from the header 110. It has been discovered that, in certain instances, known ear savers can contribute to crop loss due to the stiffness of the ear savers. In order for crop material to pass known ear savers, the stalks must bend the ear savers. To prevent snapped corn ears from being lost by the header, known corn ears must have a certain degree of stiffness to prevent the corn ears from rolling forward past the ear saver. When weak stalks contact the relatively stiff ear saver, the weak stalks responsively bend, rather than the ear saver bending, and cannot pass the ear saver to allow the deck plates to snap the corn ears from the stalks, resulting in crop loss. On the other hand, if the ear savers are not stiff enough, the ear savers cannot resist bending when contacted by snapped corn ears that roll forward, allowing the snapped corn ears to escape the header and also resulting in crop loss.

The crop material saver 250 disclosed herein, on the other hand, has saver flaps 251, 252 that are positioned to both allow relatively easy passage of crop material flow, such as standing corn stalks, in the admission direction A and inhibit crop material flow, such as snapped corn ears, in the inhibited direction I. The overall stiffness of the saver flaps 251, 252, e.g., the stiffness of the material of the saver flaps 251, 252 and/or the mounting, does not need to be high due to the positioning, which allows one or both saver flaps 251, 252 to easily deflect in the crop admission region 550 and allow passage of crop material in the admission direction A. Further, the relatively low overall stiffness of the saver flaps 251, 252 can still inhibit crop material flow in the inhibited direction I because the positioning of the saver flaps 251, 252 tends to force the flaps 251, 252 together when crop material in the crop admission region 550 travels in the inhibited direction I. Thus, the crop material saver 250 disclosed herein can reduce crop material loss by allowing easy passage of crop material flow past the saver flaps 251, 252 in the admission direction A and still effectively inhibit passage of crop material flow past the saver flaps 251, 252 in the inhibited direction I opposite the admission direction A.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A header for an agricultural vehicle, comprising:
a header frame defining a travel axis;
at least two row dividers comprising a first row divider and a second row divider carried by the header frame and defining a gap therebetween, the first row divider comprising a first side surface and the second row divider comprising a second side surface; and
a crop material saver disposed in the gap and comprising a pair of saver flaps comprising a first saver flap comprising a first mounting portion mounted to the first side surface of the first row divider and a second saver flap comprising a second mounting portion mounted to the second side surface of the second row divider, each of the saver flaps being positioned such that the saver flaps co-act as a one-way pass-through to allow crop material flow past the saver flaps in an admission direction and inhibit crop material flow past the saver flaps in an inhibited direction opposite the admission direction, each of the saver flaps defining a non-perpendicular angle relative to the travel axis, the first mounting portion and the second mounting portion each defining a respective non-perpendicular angle relative to the travel axis.

2. The header of claim 1, wherein the first saver flap and the second saver flap contact one another to define a crop admission region of the crop material saver.

3. The header of claim 2, wherein an edge of the first saver flap contacts a surface of the second saver flap.

4. The header of claim 1, wherein the first side surface comprises a first flat portion to which the first mounting portion mounts and the second side surface comprises a second flat portion to which the second mounting portion mounts.

5. The header of claim 4, wherein the first flat portion is recessed inwardly relative to a lateral edge of the first row divider and the second flat portion is recessed inwardly relative to a lateral edge of the second row divider.

6. The header of claim 1, further comprising a pair of deck plates carried by the header frame and defining a deck plate channel therebetween, the crop material saver having a portion disposed above the deck plate channel.

7. The header of claim 1, wherein each of the saver flaps comprises rubber.

8. The header of claim 1, wherein the non-perpendicular angle of the first mounting portion defines the non-perpendicular angle of the first saver flap and the non-perpendicular angle of the second mounting portion defines the non-perpendicular angle of the second saver flap.

9. An agricultural vehicle, comprising:
a chassis defining a travel axis; and
a header carried by the chassis, the header comprising:
a header frame;
at least two row dividers comprising a first row divider and a second row divider carried by the header frame and defining a gap therebetween, the first row divider comprising a first side surface and the second row divider comprising a second side surface; and
a crop material saver disposed in the gap and comprising a pair of saver flaps comprising a first saver flap comprising a first mounting portion mounted to the first side surface of the first row divider and a second saver flap comprising a second mounting portion mounted to the second side surface of the second row divider, each of the saver flaps being positioned such that the saver flaps co-act as a one-way pass-through to allow crop material flow past the saver flaps in an admission direction and inhibit crop material flow past the saver flaps in an inhibited direction opposite the admission direction, each of the saver flaps defining a non-perpendicular angle relative to the travel axis, the first mounting portion and the second mounting portion each defining a respective non-perpendicular angle relative to the travel axis.

10. The agricultural vehicle of claim 9, wherein the first saver flap and the second saver flap contact one another to define a crop admission region of the crop material saver.

11. The agricultural vehicle of claim 10, wherein an edge of the first saver flap contacts a surface of the second saver flap.

12. The agricultural vehicle of claim 9, wherein the first side surface comprises a first flat portion to which the first mounting portion mounts and the second side surface comprises a second flat portion to which the second mounting portion mounts.

13. The agricultural vehicle of claim 12, wherein the first flat portion is recessed inwardly relative to a lateral edge of the first row divider and the second flat portion is recessed inwardly relative to a lateral edge of the second row divider.

14. The agricultural vehicle of claim 9, further comprising a pair of deck plates carried by the header frame and defining a deck plate channel therebetween, the crop material saver having a portion disposed above the deck plate channel.

15. The agricultural vehicle of claim 9, wherein each of the saver flaps comprises rubber.

16. The agricultural vehicle of claim 9, wherein the non-perpendicular angle of the first mounting portion defines the non-perpendicular angle of the first saver flap and the non-perpendicular angle of the second mounting portion defines the non-perpendicular angle of the second saver flap.

* * * * *